United States Patent
Häcker et al.

(10) Patent No.: US 7,316,381 B2
(45) Date of Patent: Jan. 8, 2008

(54) ARTICULATED BEARING SUPPORTS FOR LASER RESONATORS

(75) Inventors: Michael Häcker, Wimsheim (DE); Wolfgang Andreasch, Weinstadt (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 11/106,808

(22) Filed: Apr. 15, 2005

(65) Prior Publication Data

US 2005/0178934 A1     Aug. 18, 2005

Related U.S. Application Data

(63) Continuation of application No. 10/173,350, filed on Jun. 14, 2002, now abandoned.

(30) Foreign Application Priority Data

Jun. 15, 2001   (EP)   ................................. 01113604

(51) Int. Cl.
    *F16M 13/00* (2006.01)
(52) U.S. Cl. ...................... 248/622; 248/603; 248/637; 267/140.3; 267/140.5; 267/160
(58) Field of Classification Search ............ 248/176.1, 248/176.3, 299.1, 284.1, 276.1, 622, 638, 248/603, 637; 359/849, 846; 267/140.5, 267/160, 140.3; 403/291, 2
See application file for complete search history.

(56) References Cited

U.S. PATENT DOCUMENTS

| | | | | |
|---|---|---|---|---|
| 3,063,670 A | * | 11/1962 | Young | ...................... 267/140.5 |
| 3,384,424 A | * | 5/1968 | Raines | ........................ 403/291 |
| 3,407,018 A | * | 10/1968 | Miller | ......................... 359/896 |
| 3,420,582 A | * | 1/1969 | Shelley | ........................ 403/291 |
| 3,575,475 A | * | 4/1971 | Boerner | ....................... 403/291 |
| 3,597,938 A | * | 8/1971 | Hellen et al. | .................. 464/78 |
| 3,700,289 A | * | 10/1972 | Bilinski et al. | ............. 403/291 |
| 4,691,586 A | * | 9/1987 | van Leijenhorst et al. | ....................... 74/490.09 |
| 5,062,619 A | * | 11/1991 | Sato | ........................... 267/154 |
| 5,302,044 A | * | 4/1994 | Spariat et al. | .............. 403/291 |
| 5,317,875 A | | 6/1994 | O'Brien et al. | |
| 5,561,728 A | * | 10/1996 | Kobayashi et al. | ........... 385/97 |
| 5,694,814 A | | 12/1997 | Gardam | |
| 5,764,498 A | * | 6/1998 | Sundstrom | ................... 361/809 |

FOREIGN PATENT DOCUMENTS

DE        3234618        3/1984

* cited by examiner

*Primary Examiner*—Amy J. Sterling

(57) ABSTRACT

In a bearing support (10) for a laser resonator, adjacent support sections (11*a*, 11*b*) are directly and undetachably connected to each other by an articulated deflectable joint (12). An additional vertical safety on the bearing support is no longer necessary since the two support sections (11*a*, 11*b*) are already held together in a vertically secure manner by the articulated joint (12).

24 Claims, 17 Drawing Sheets

Translational degree of freedom = rotational degree of freedom of axis 25
+ rotational degree of freedom of axis 26

Translational = rotation of axis 39 + rotation of axis 36
Translational = rotation of axis 35 + rotation of axis 37

ARTICULATED BEARING SUPPORTS FOR LASER RESONATORS

CROSS REFERENCE TO RELATED APPLICATION

The present application is a continuation of U.S. patent application Ser. No. 10/173,350 filed Jun. 14, 2002 now abandoned.

BACKGROUND OF THE INVENTION

The invention relates to a bearing support, in particular for a laser resonator, with at least two support sections and an articulated joint provided between sections, and a corresponding bearing support assembly with such bearing supports.

To allow the horizontal shifts of a laser resonator—occurring, e.g., due to temperature changes or accelerations—in all directions, in a known bearing assembly the laser resonator is connected with a base plate by three bearing supports, namely by a four-way bearing support, a three-way bearing support and a two-way bearing support. The four-way bearing support is designated as a fixed bearing support and has two rotational degrees of freedom and no translational degree of freedom. The three-way bearing support with two rotational and one translational degrees of freedom is designated as a one-dimensional movable bearing support, and the two-way bearing support with two rotational and two translational degree of freedom is designated as a two-dimensional movable bearing support.

The fixed bearing support of the known bearing support assembly is formed by a cone provided on the resonator frame that is open downwardly and in which a ball bearing is mounted so that it may tilt but it is not able to slide in the plane of the bearing. The one-dimensional movable bearing support is formed by a V-bolt provided on the resonator frame that is open downwardly and in which a ball bearing is mounted able to tilt and able to slide linearly. The two-dimensional movable bearing support is formed by a flat bearing surface on the resonator frame, on which a ball bearing sits and is able to slide freely. In all three bearing supports, the bearing balls are able to tilt all around due to their spherical surfaces.

On each of its three bearing supports, the known bearing assembly additionally has a vertical safety to prevent the laser resonator from lifting off and springing out during transport. The vertical safety consists of a screw connection designed between the ball bearing and the bearing surface. The laser resonator is not to be operated with the transport safety detached, but it is sometimes forgotten to detach the vertical safety again after transport, thus leading to errors.

It is an object of the present invention is to improve a novel bearing support for lasers and the like in which the bearing supports are vertically secured as simply and easily as possible.

Another object is to provide a support assembly using said bearing supports to provide a corresponding bearing assembly.

SUMMARY OF THE INVENTION

This technical problem is solved according to the invention in that adjacent support sections are each connected together directly and undetachably by an articulated deflection joint.

The essential advantage of the invention consists in that no additional vertical safety is required on the bearing support but rather in each case the two support sections of the bearing support are held against each other already vertically secured. In this way, the laser resonator can also be mounted vertically, rotated 180° or oriented in any other desired rotated plane.

In a particular preferred form of construction of the invention, adjacent support section are connected together forming one piece and/or mechanically fitting by the articulated joint, such that the bearing support is designed with a solid joint.

In another form of construction, the bearing support is designed from several individual parts. For example, the bearing support can be made up of two identical halves rotated 90° from each other and these can be produced particularly inexpensively as extrusion profiles.

In a particularly preferred form of construction, the at least one articulated joint is designed as a deflection joint able to be tilted all around, with at least two tilting axes arranged rotated from each other, in particular 90°. When all tilting axes are arranged in one plane, this deflection joint is able to be tilted all around and only allows a tilting of its two support sections toward each other but no lateral relative shifting. Since it has no translational degree of freedom in the bearing plane, the bearing support forms a fixed bearing.

In a first further development of this form of construction, the articulated joint has a central deflection element that deflects back toward its two adjacent support sections far enough so that an elastic, all around tilting of the two support sections toward each other becomes possible.

In a second further development, an articulated joint able to be tilted all around is designed as a cardan deflection joint. For this purpose, the two tilting axes of the articulated joint are formed by two continuous or divided deflection elements arranged rotated from each other, in particular 90°. Any desired tilting of the two adjacent support sections of the articulated joint towards each other can be achieved by tilting around one deflection element or around both deflection elements at the same time. The two deflection elements can be designed as cross-shaped deflection elements if they are arranged in one plane.

If the bearing support has, at a distance from the articulated joint able to tilt all around, another articulated joint able to tilt around only one tilt axis, i.e., on two sides, a lateral parallel shifting of the sections of the bearing support is possible by tilting around both articulated joints. The vertical shifting connected with this structure at the same time has a negligible effect on the values produced. Since it has one translational degree of freedom laterally, the bearing support forms a one-dimensional movable bearing. In particular with a one-piece design of the bearing support, the two-sided articulated joint can be designed as a deflection joint with at least one continuous/or divided deflection element defining the tilt axis.

If the bearing support has two deflection joints able to tilt all around and arranged one above the other, a parallel shifting of the sections of the bearing support is possible in all lateral directions. Since it has two translational degrees of freedom laterally, the bearing support forms a two-dimensional movable bearing.

In the simplest case, a deflection element is formed by two slits opposite each other and open toward the side. The bearing support can also be produced at first with slits that are closed toward the outside and that can then be subsequently opened toward the outside depending on the application. As an alternative, the bearing support can also be produced at first with open slits that are then closed depending on the application.

Especially in the case of a one-piece design, the bearing support can also be designed massively or as a hollow body, whereby, in the latter case, suitable stiffening elements may be required, specifically in the joint areas. It is also possible to design the bearing support as a one-piece cast part.

In a further particularly preferred form of construction of the invention, the at least one articulated joint is designed as a cardan joint, through whose cardan body two support sections are connected together undetachably. The cardan joint with its two joint axes allows tilting of the two support sections toward each other but no lateral relative shifting. Since it has no translational degree of freedom, the bearing support forms a fixed bearing.

If the bearing support has an articulated joint able to tilt on two sides, in addition to the cardan joint, a lateral relative shifting of the sections of the bearing support is possible by tilting around both articulated joints. Since it has one translational degree of freedom laterally, the bearing support forms a one-dimensional movable bearing.

Such a one-dimensional movable bearing can also be formed in that a support section, or the cardan body of the cardan joint is mounted, is able to shift in the direction of at least one of the two axes of the cardan joint.

To form a two-dimensional movable bearing, the bearing support has two cardan joints arranged one above the other, whereby a parallel shifting of the sections of the bearing support is possible in all directions. Since it has two translational degrees of freedom laterally, the bearing support forms a two-dimensional movable bearing. Such a two-dimensional movable bearing can also be formed in that the cardan body of the cardan joint is mounted so that it is able to shift in the direction of the two joint axes of the cardan joint.

The invention also relates to a bearing assembly, in particular as the substructure for a laser resonator, with at least three bearing supports, as described above.

In a preferred form of construction, the bearing assembly according to the invention comprises three bearing supports, each of which has at the same level an articulated joint able to tilt all around, and one bearing support additionally has an articulated joint able to tilt on two sides and another bearing support additionally has a further articulated joint able to tilt all around.

The various bearing supports can be produced inexpensively in one piece from identical basic bodies of aluminum, for example, from which the different bearing supports are produced by reworking, e.g., the opening of connecting links by milling, or the closing of slits by welding.

Further advantages of the invention are shown in the detailed description and the drawings. The aforementioned features and those listed further on can also be used according to the invention individually or several at a time in any desired combination. The forms of construction shown and described are not to be considered an exhaustive listing but rather are of an exemplary nature for illustrating the invention.

BRIEF DESCRIPTION OF THE ATTACHED DRAWINGS

Figure 1:
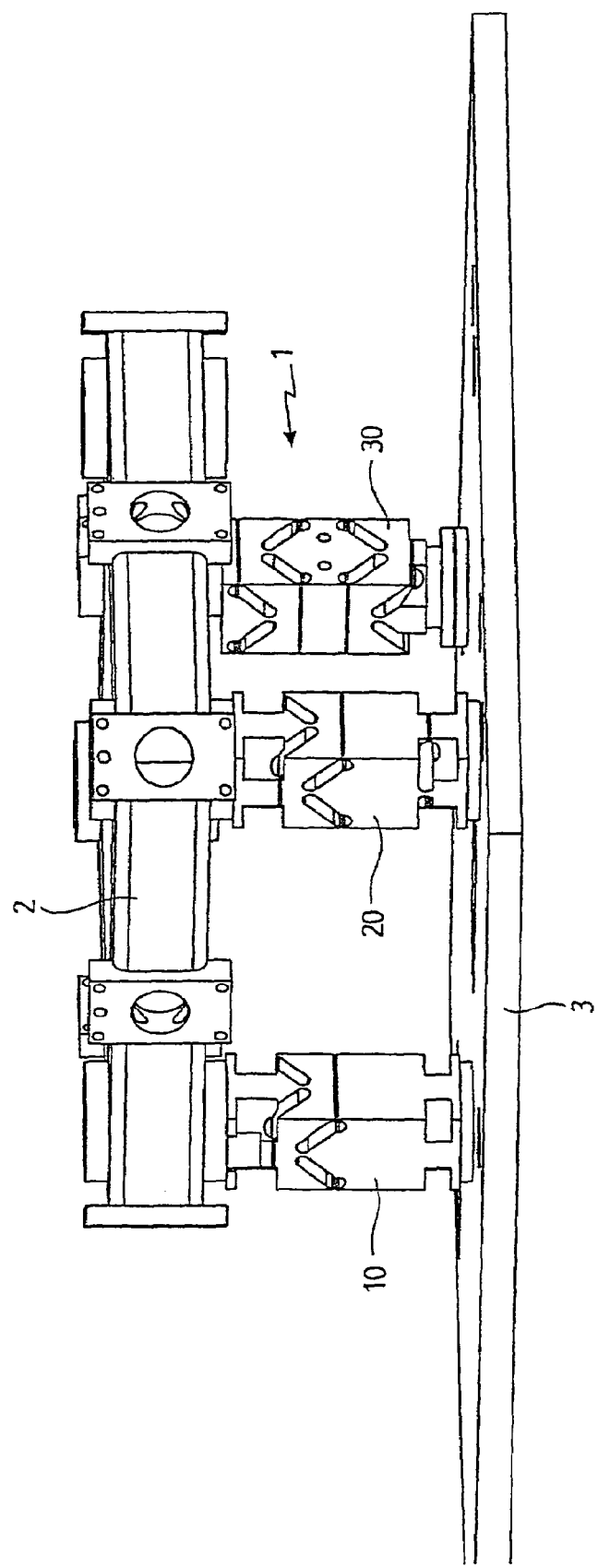
FIG. 1 is a side elevational view of a bearing support assembly according to the invention with three bearing supports, each designed as a single piece, as the substructure for a laser resonator.
Figure 3:
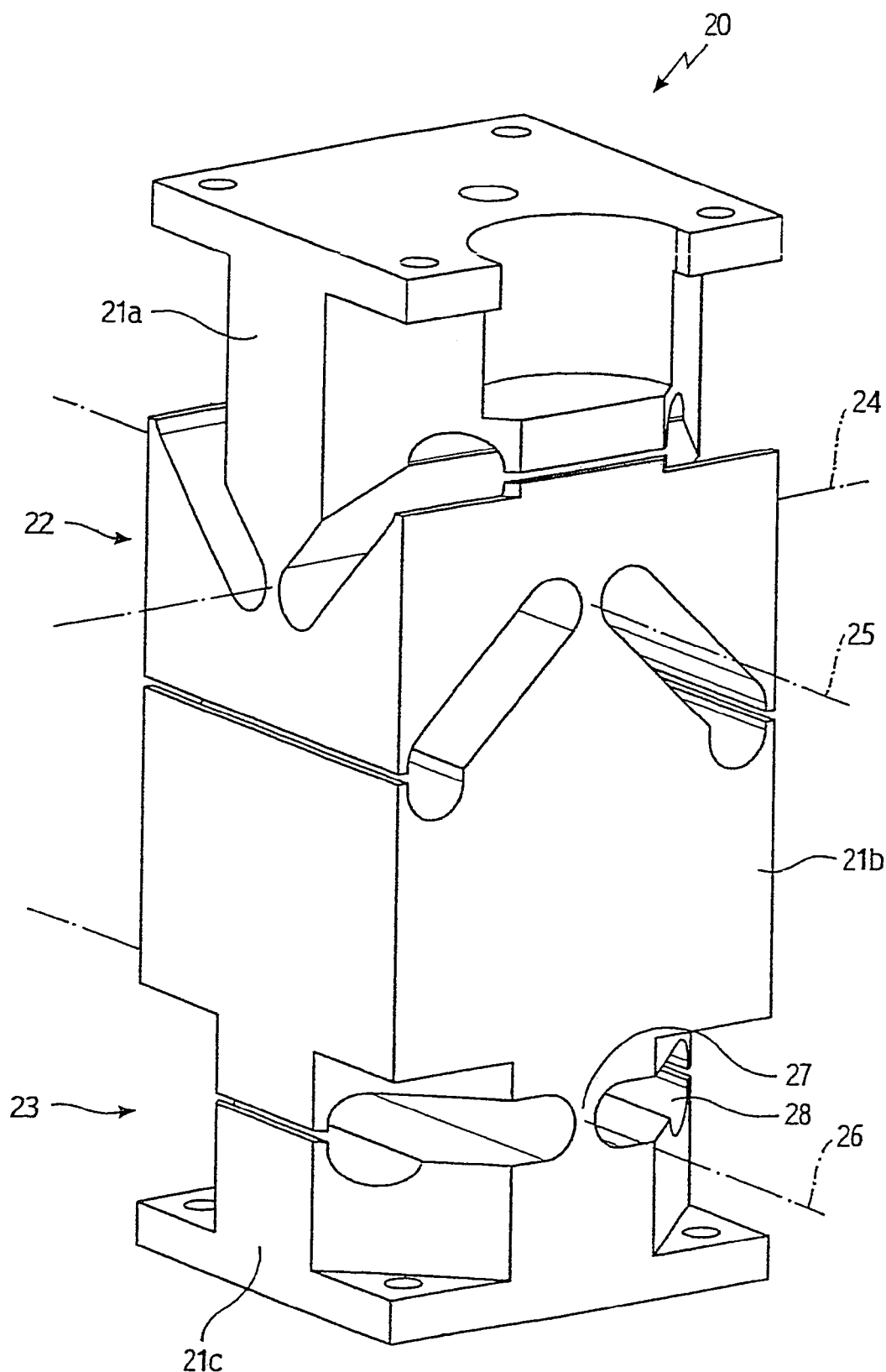
FIG. 3 is a perspective view of a bearing support designed as a one-dimensional movable bearing of the bearing support assembly shown in FIG. 1.
Figure 3A:
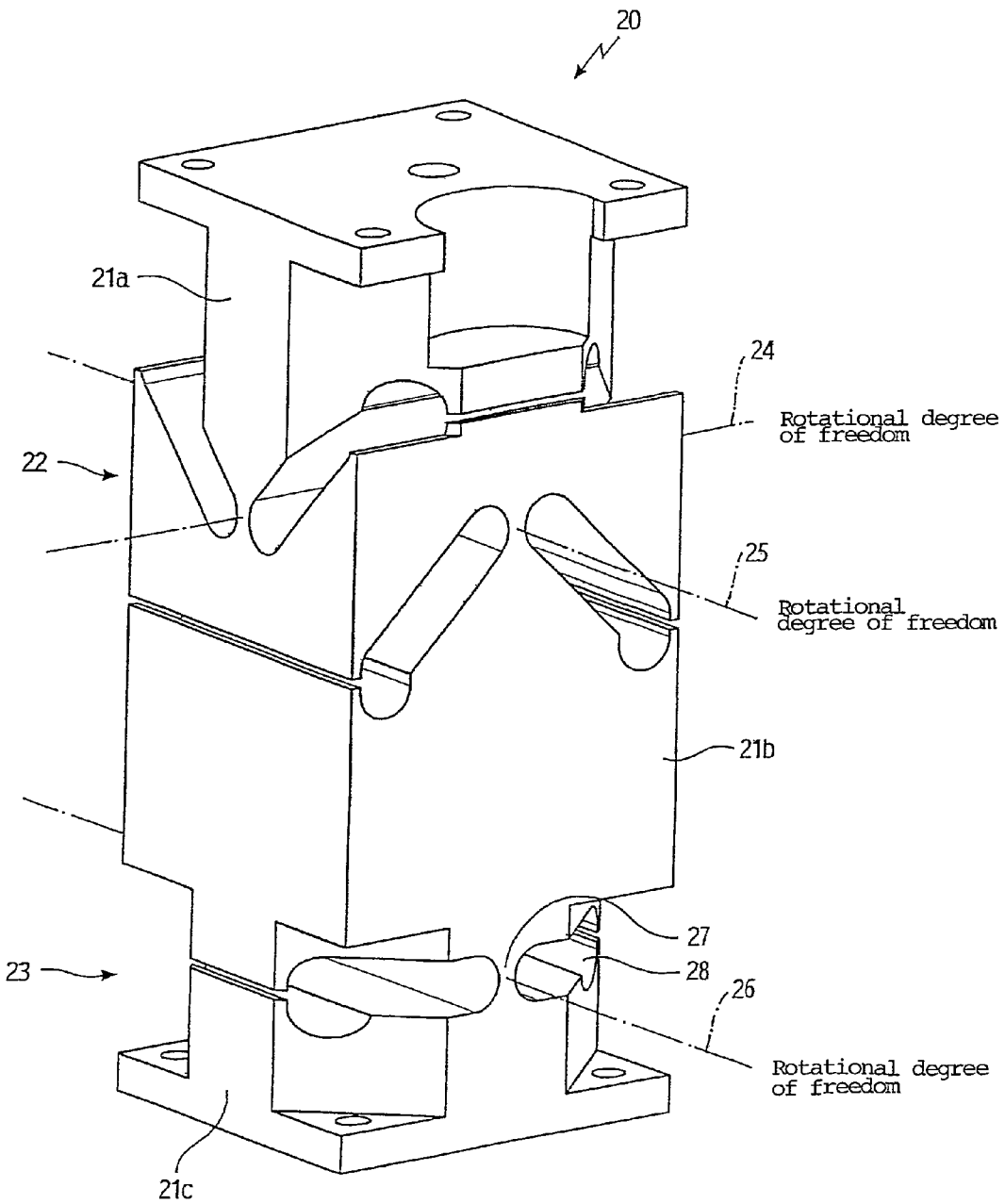
Figure 3B:
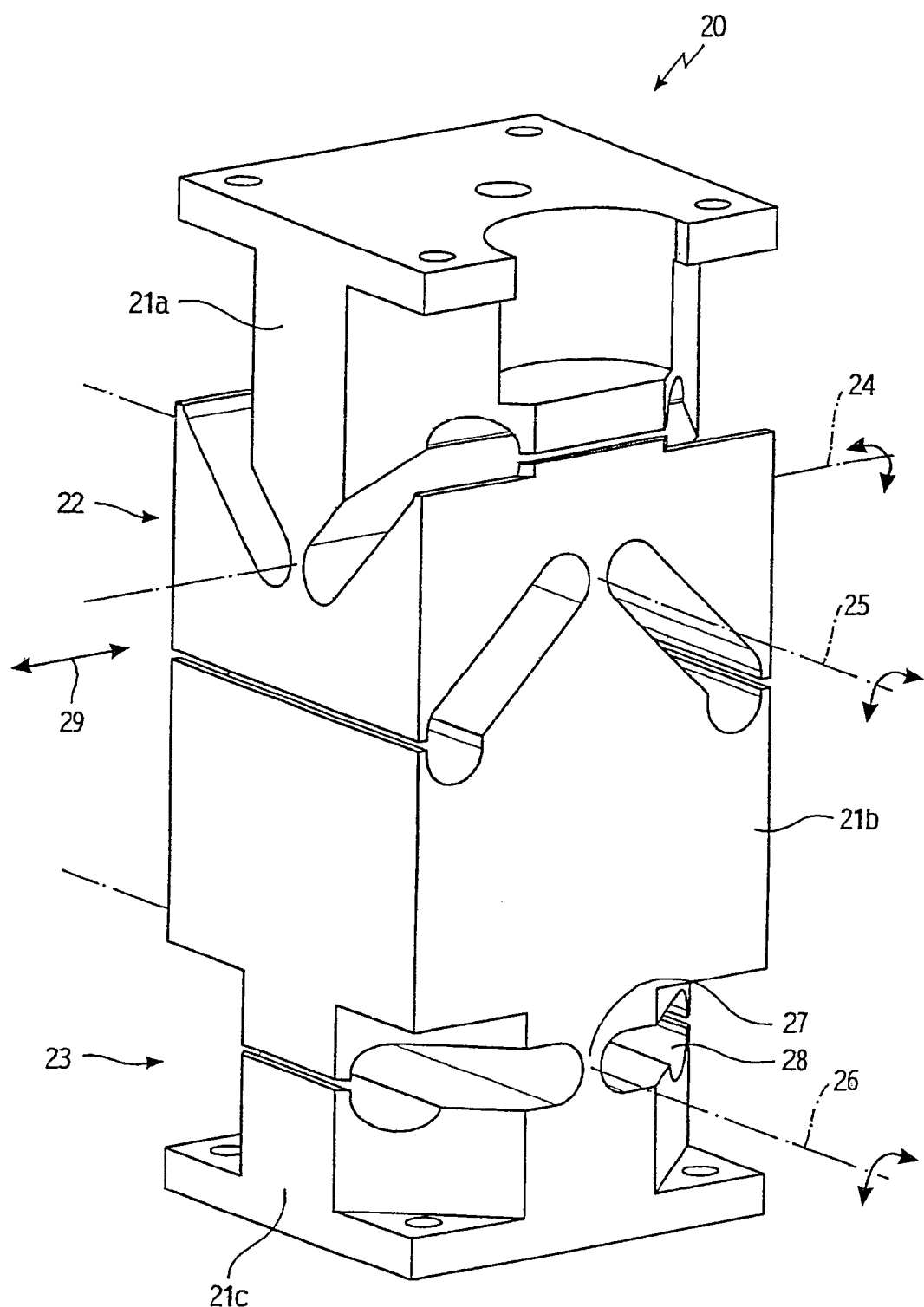
Figure 4:
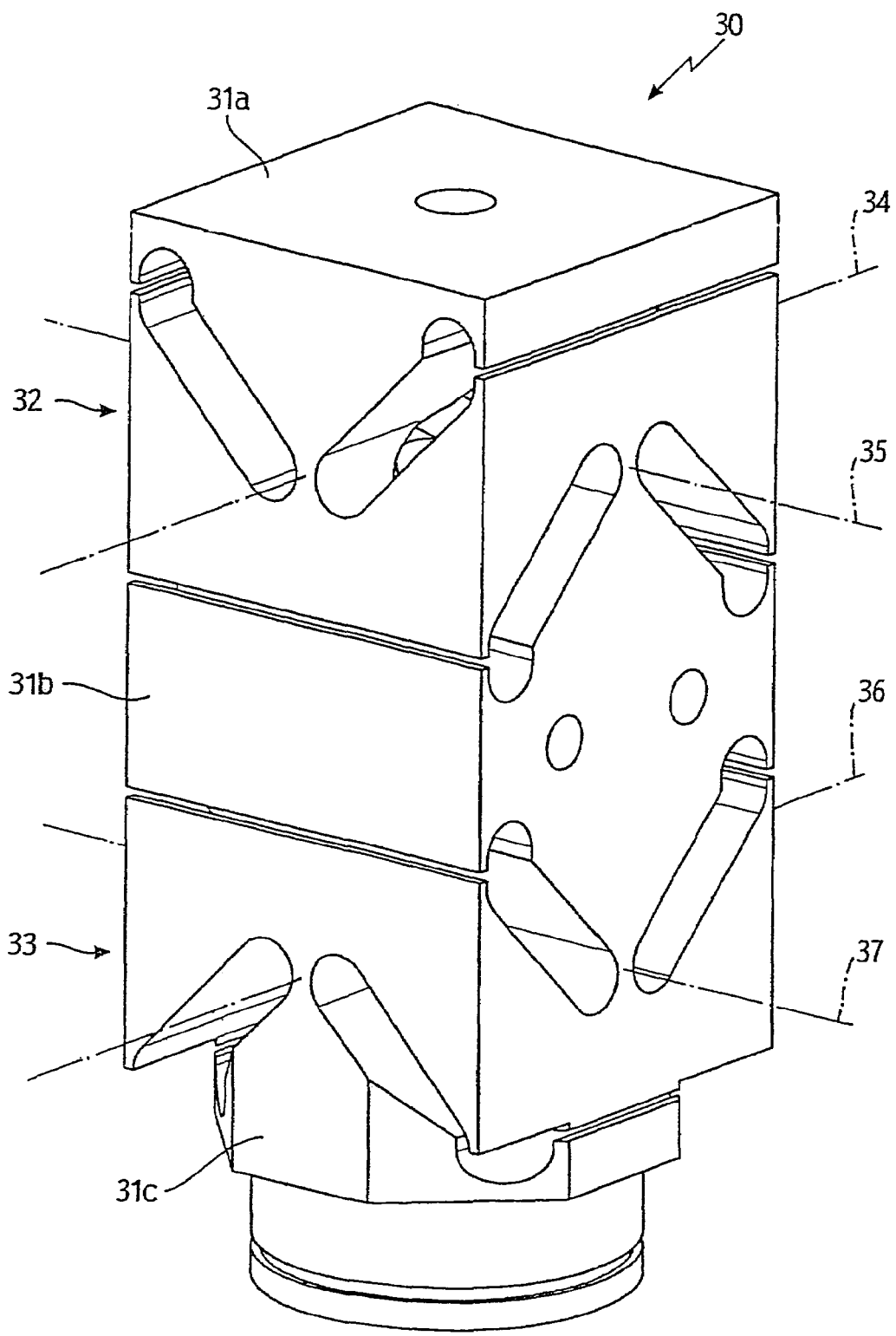
Figure 4A:
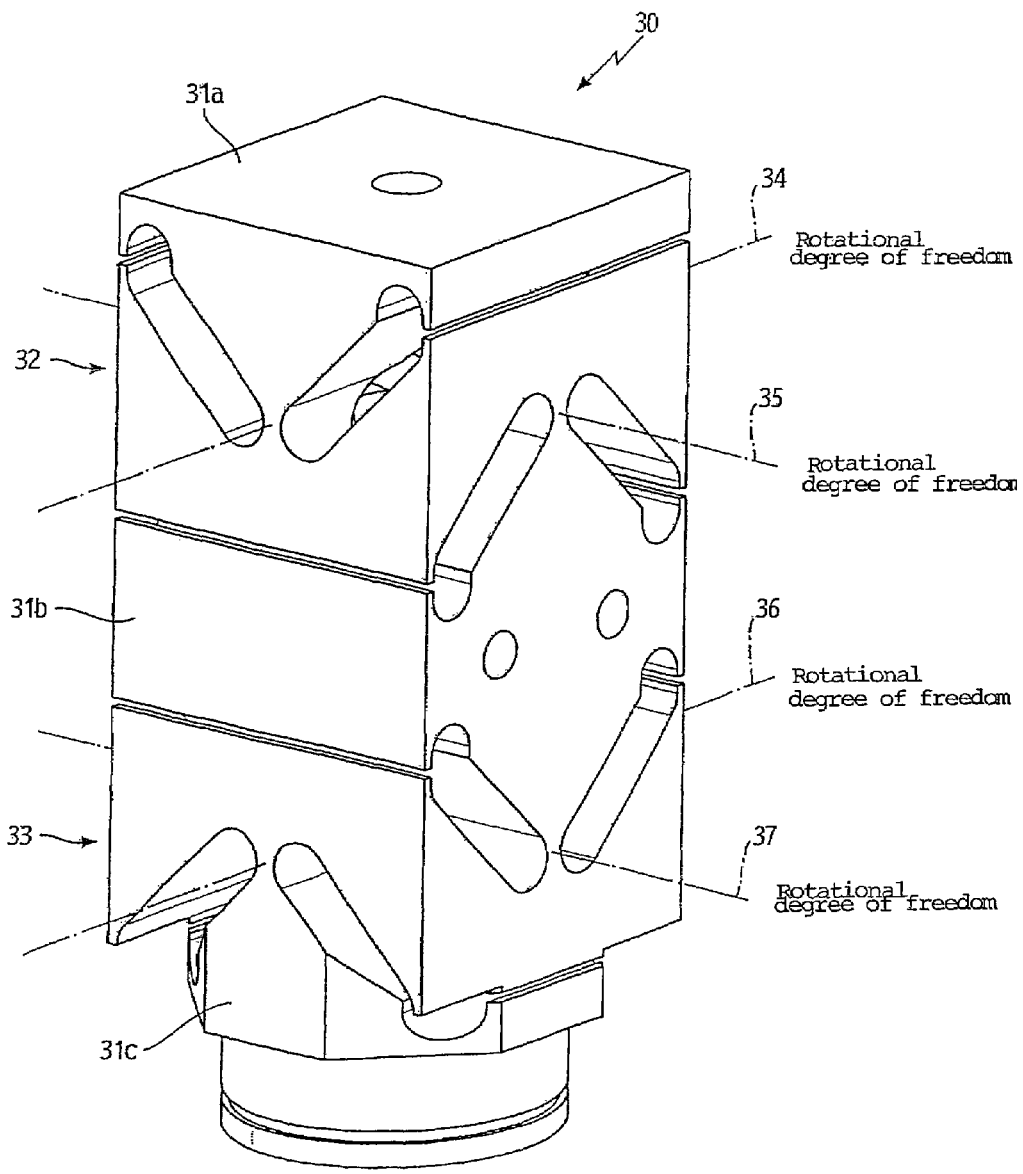
Figure 4B:
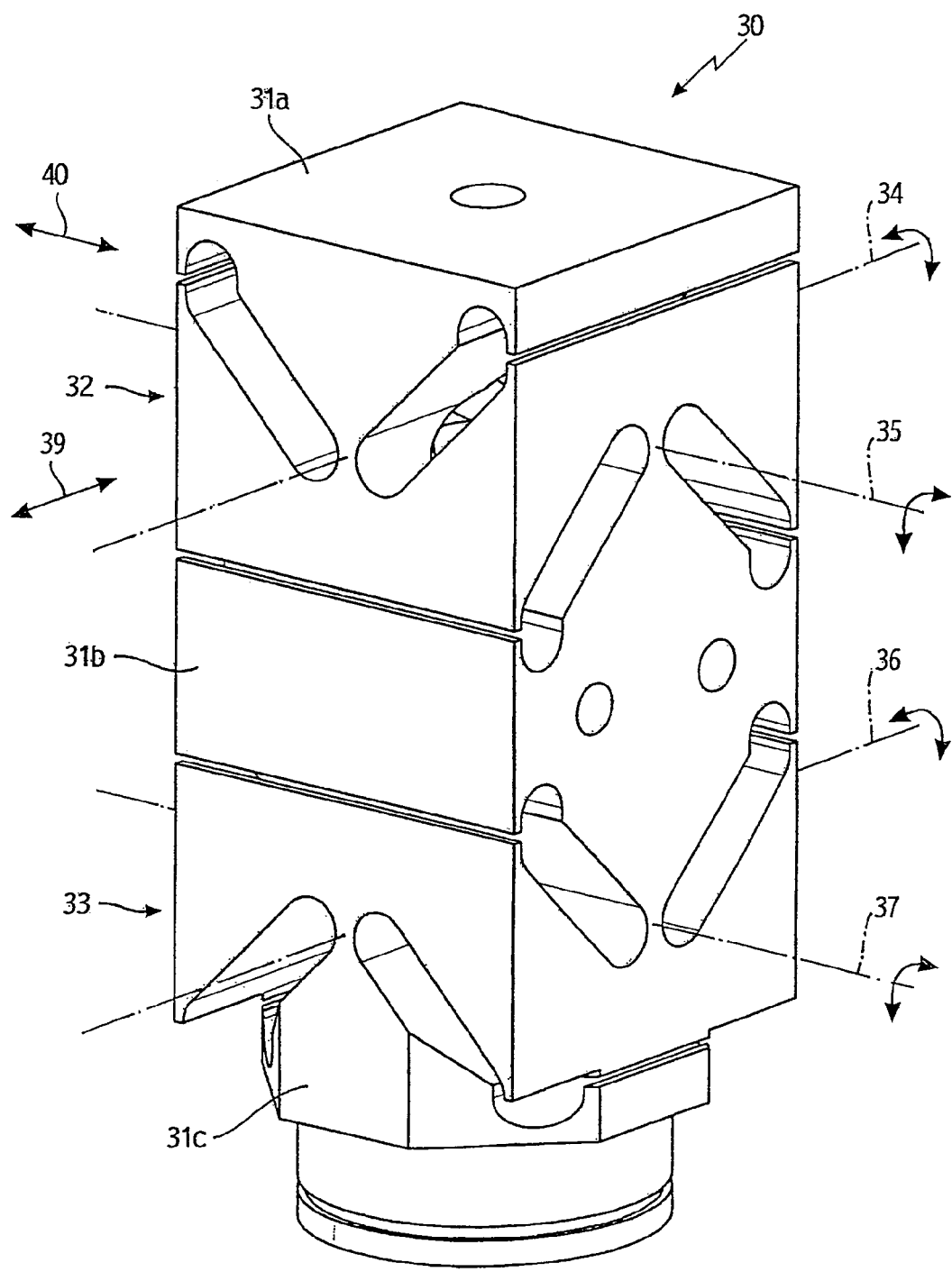
Figure 5:
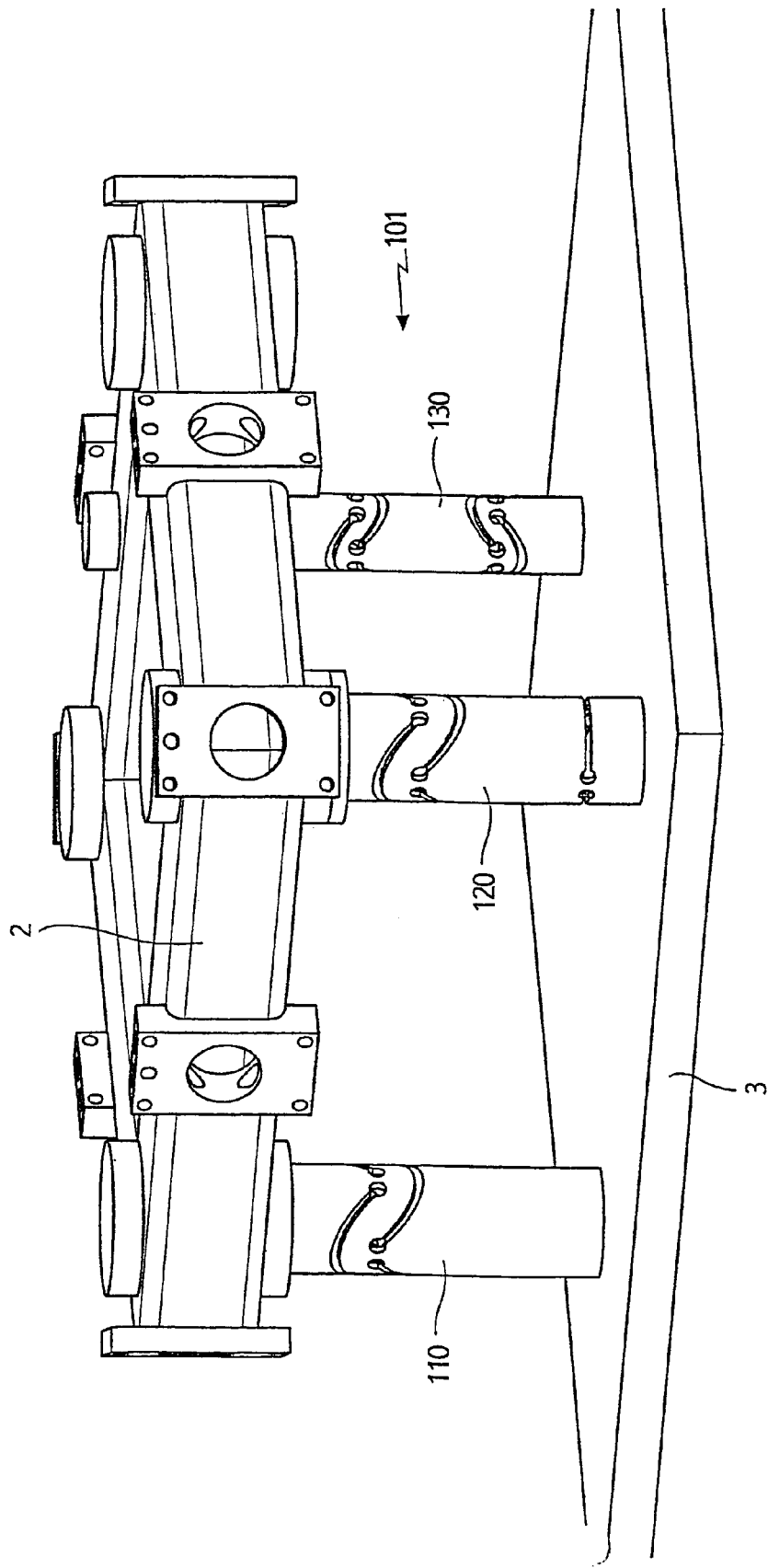
Figure 6:
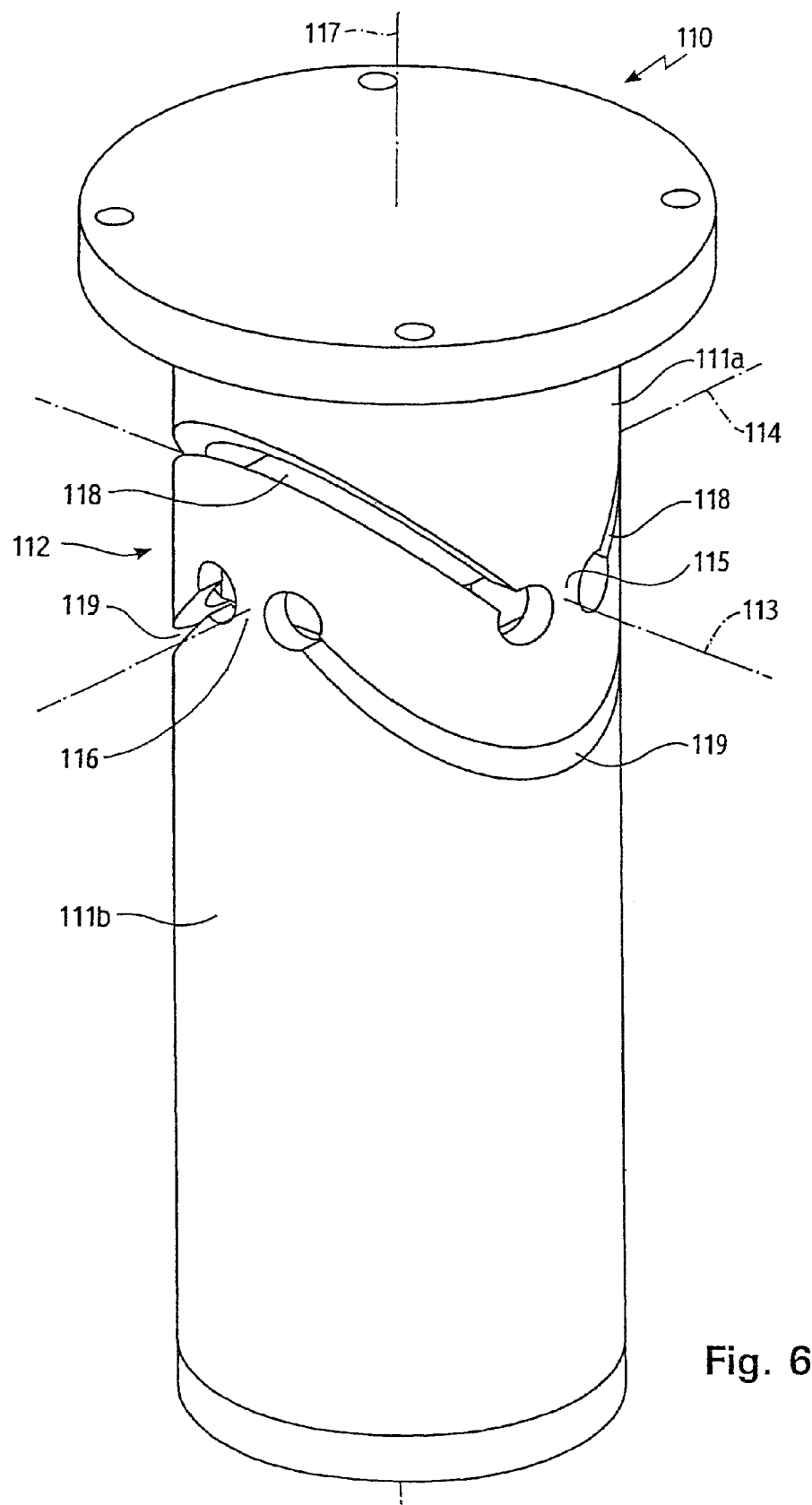
Figure 7:
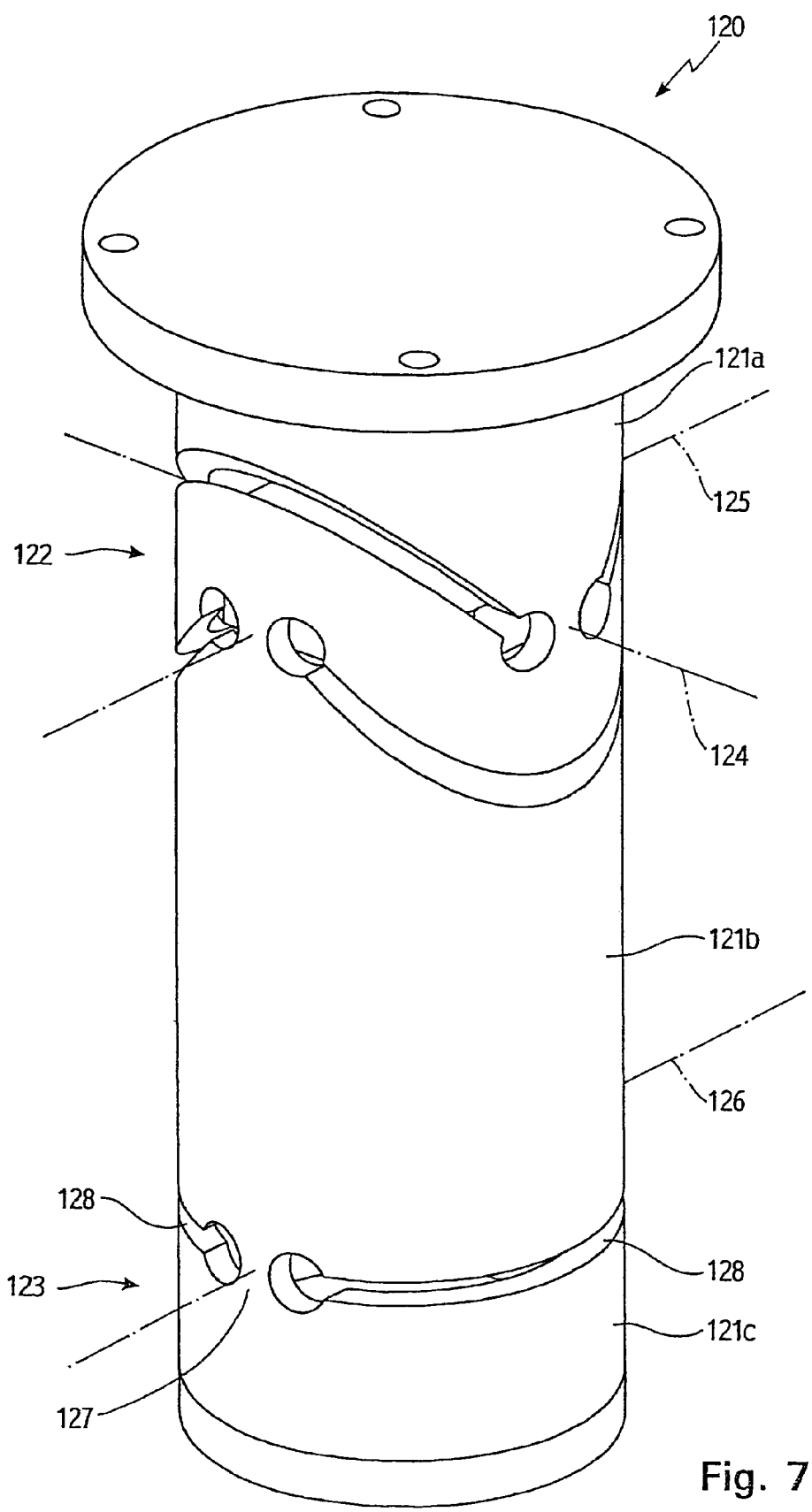
Figure 8:
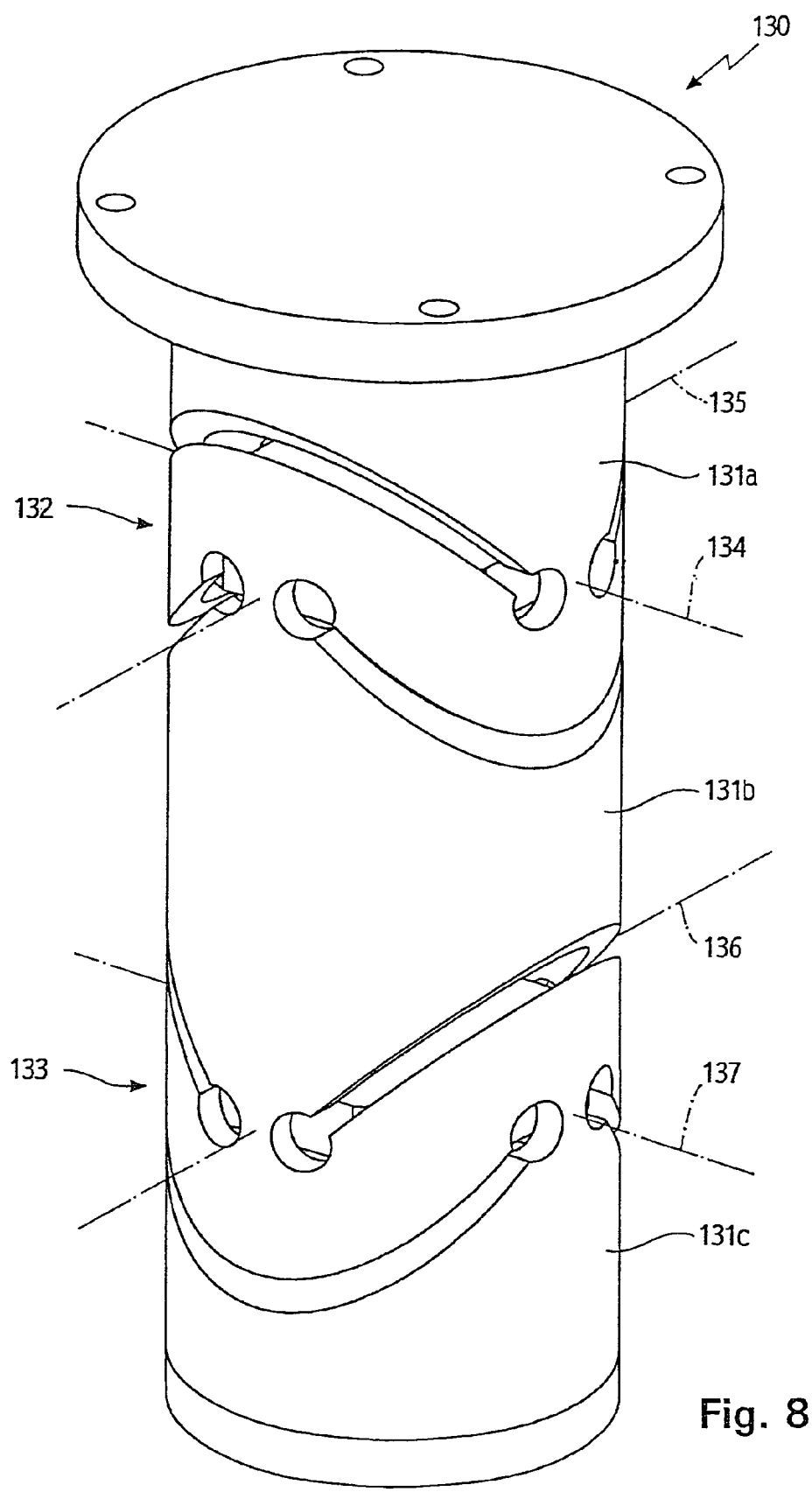
Figure 9:
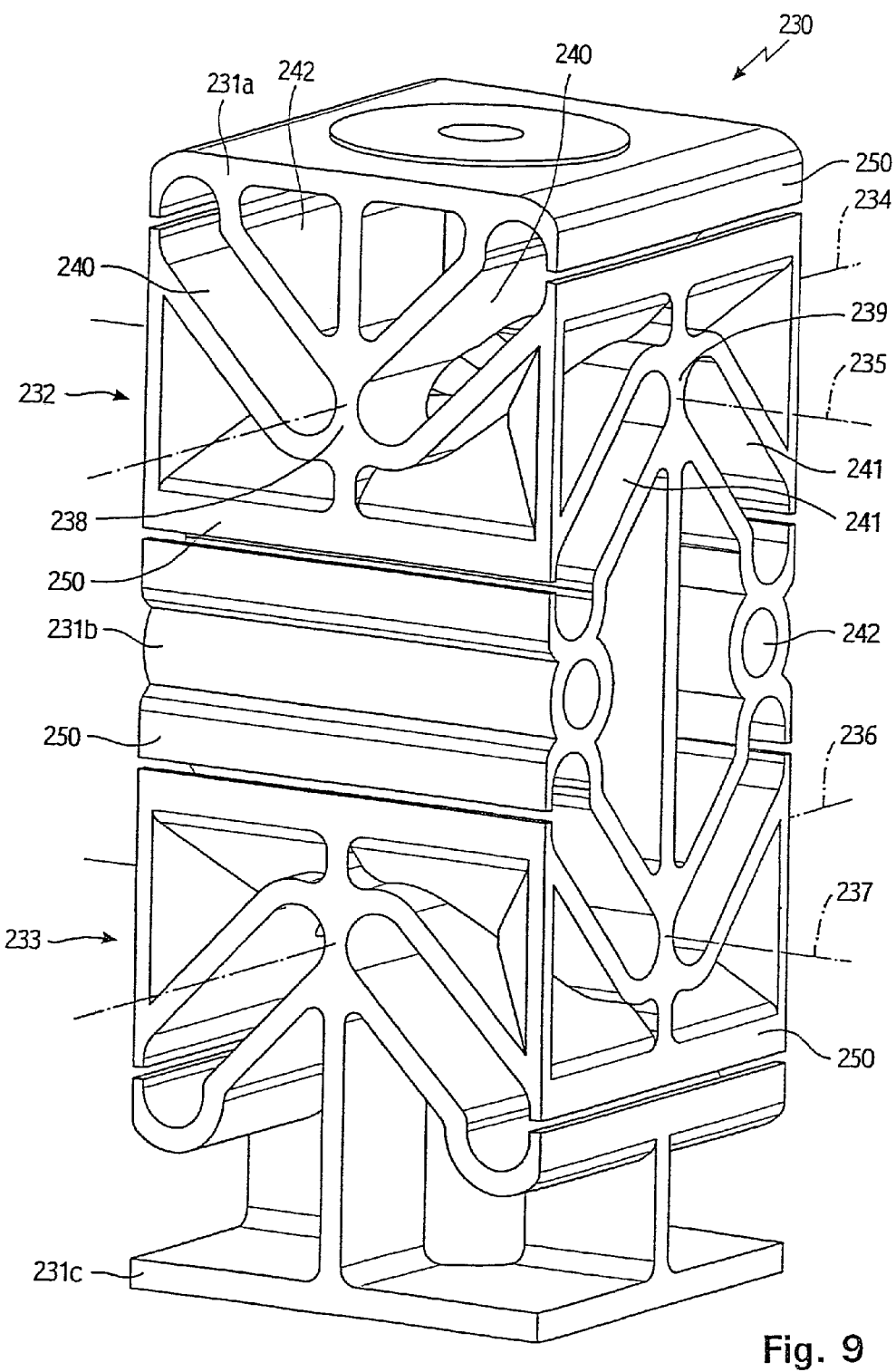
Figure 10A:
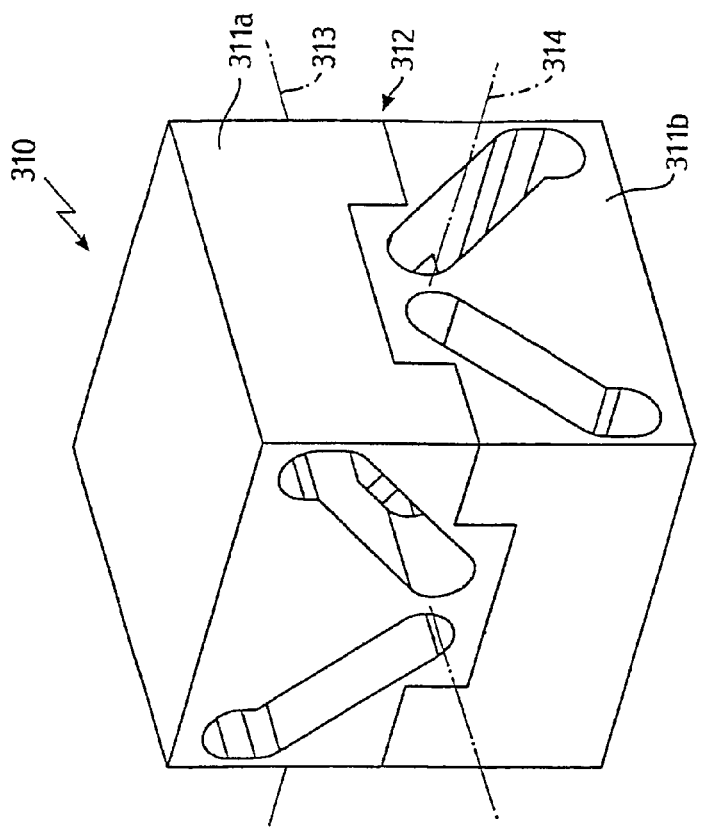
Figure 10B:
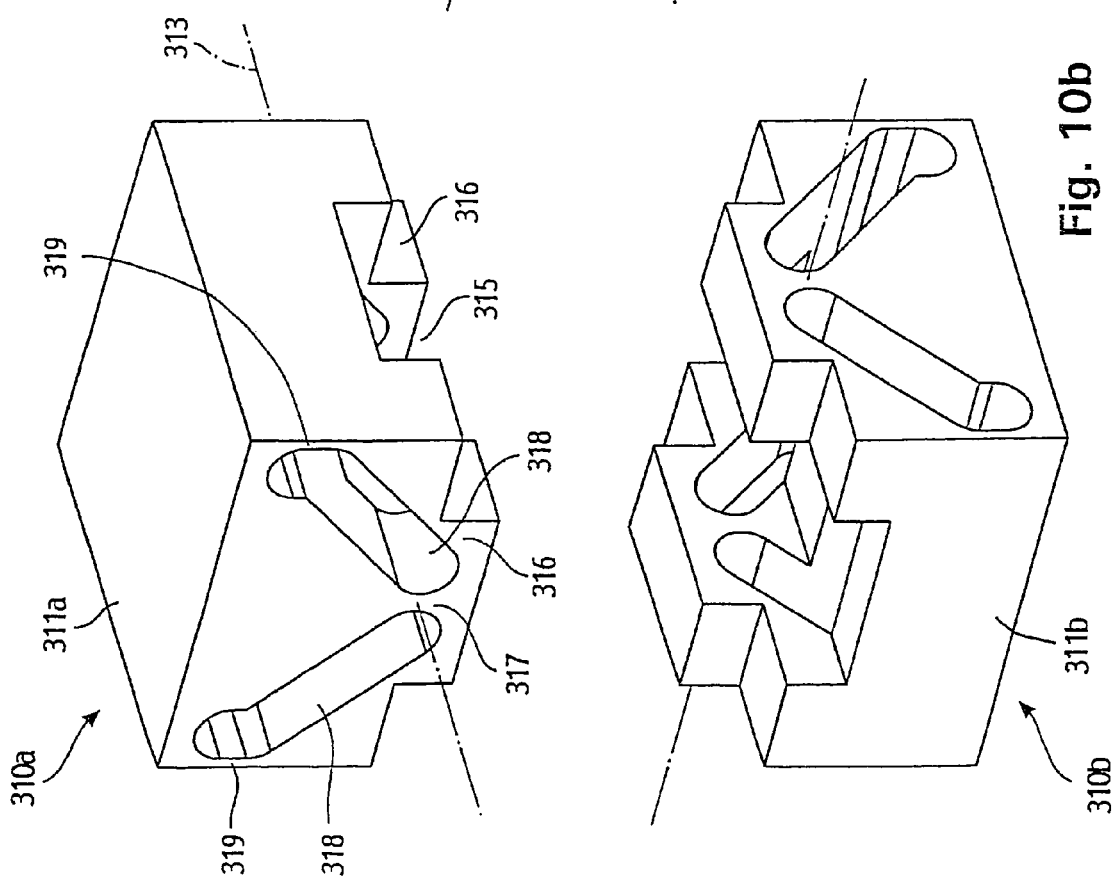
Figure 11:
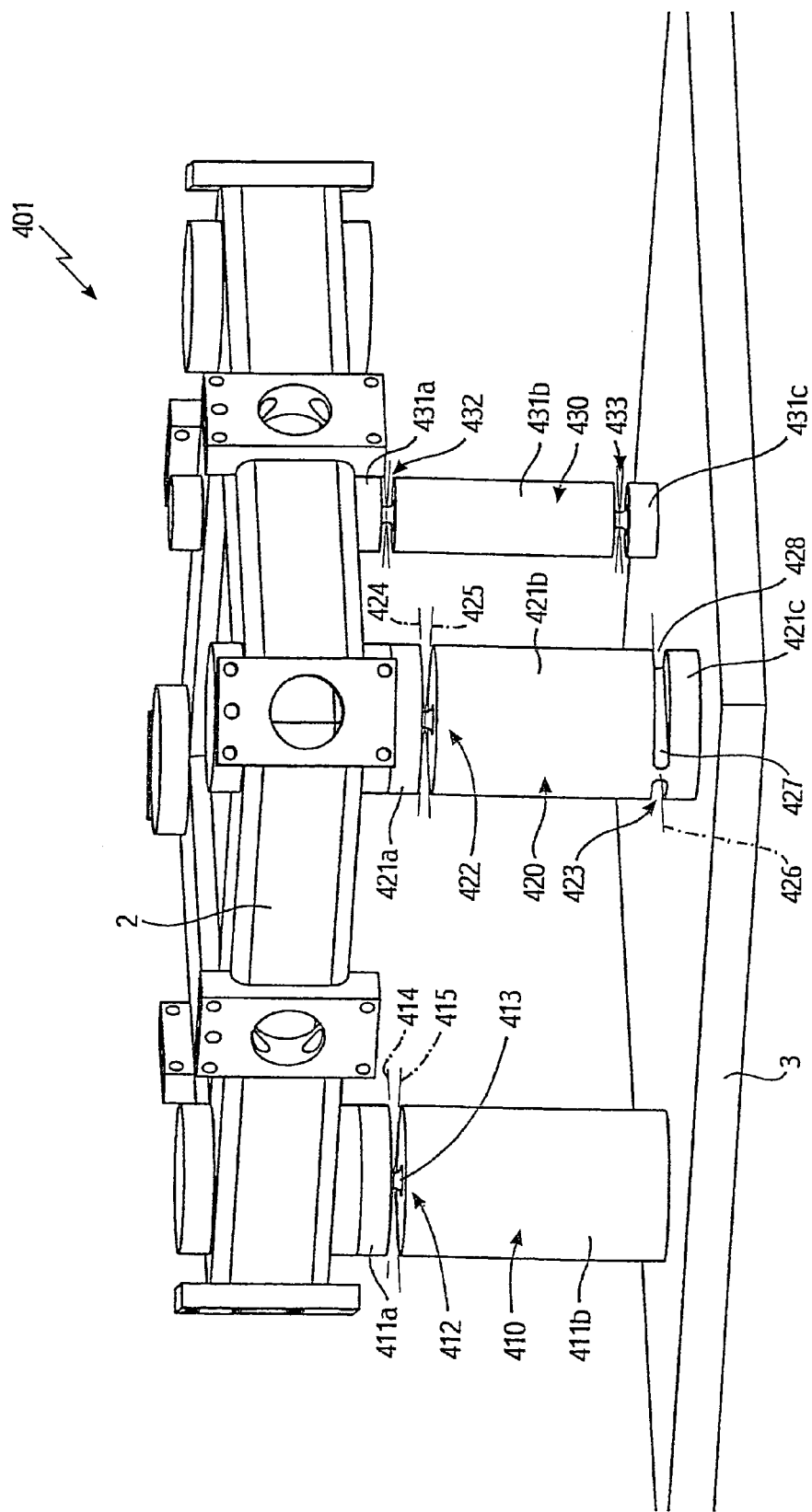
Figure 12:
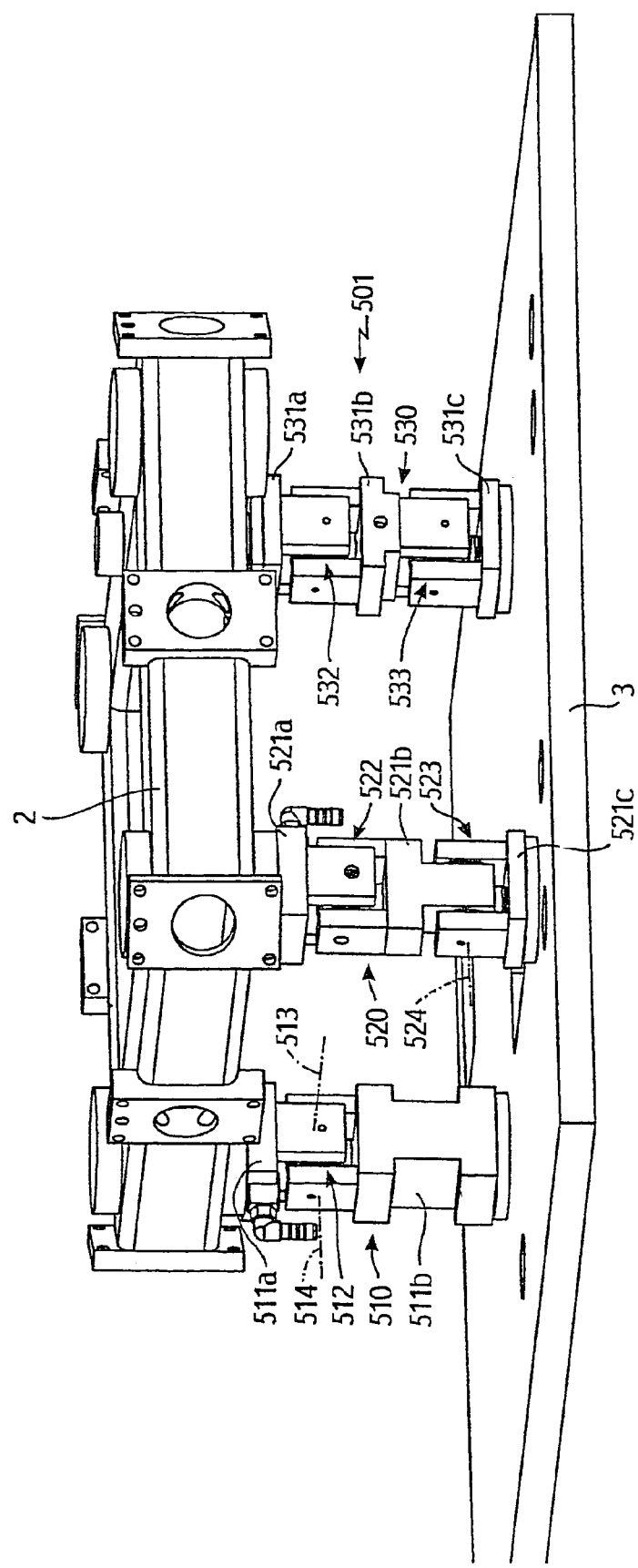
Figure 13:
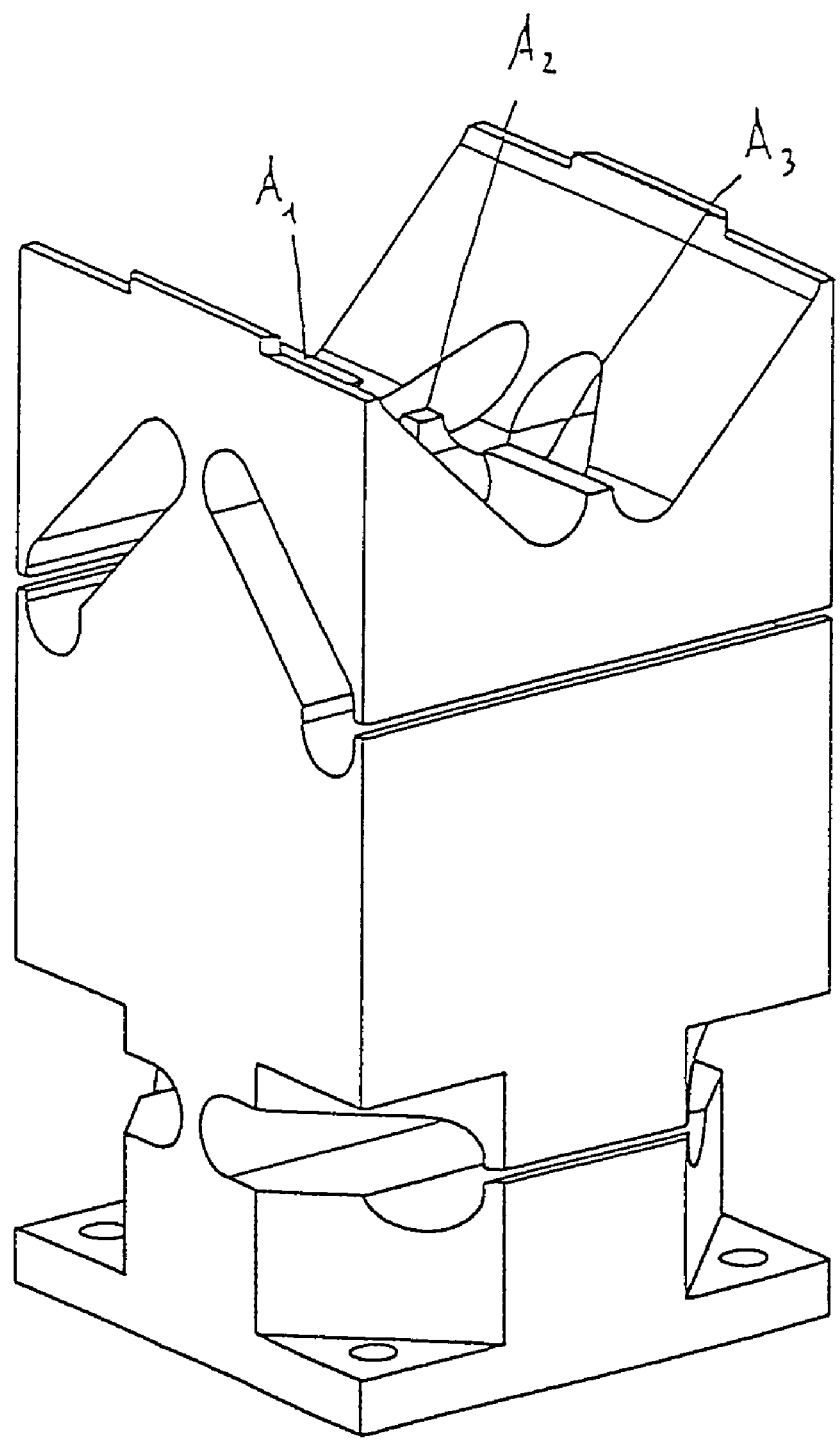

FIG. 3a adds to FIG. 3 legends on the degrees of freedom in the illustrated embodiment;

FIG. 3b adds to FIG. 3 arrows which show the motion in the rotational and translational degrees of freedom;

FIG. 4 is a perspective view of a bearing support designed as a two-dimensional movable bearing of the bearing support assembly shown in FIG. 1;

FIG. 4a adds to FIG. 4 legends as to the degrees of freedom in the illustrated embodiment;

FIG. 4b adds to FIG. 4 arrows which show the effect of motion in the rotational and translational degrees of freedom;

FIG. 5 is a perspective view of a second embodiment of the bearing support assembly according to the invention with three bearing supports each designed as a single piece;

FIG. 6 is a perspective view of a bearing support designed as a fixed bearing of the bearing support assembly shown in FIG. 5;

FIG. 7 is a perspective view of a bearing support designed as a one-dimensional movable bearing support of the bearing support assembly shown in FIG. 5;

FIG. 8 is a perspective view of a bearing support designed as a two-dimensional movable bearing support of the bearing support assembly shown in FIG. 5;

FIG. 9 is a perspective view of a bearing support designed as a one-piece cast part as another example of execution of the bearing support assembly according to the invention;

FIG. 10a is a perspective view of a two-piece bearing support designed as a fixed bearing as another example of execution of the present invention in assembled state;

FIG. 10b is an exploded view of the bearing support of FIG. 10a in a disassembled state;

FIG. 11 is a perspective view of another example of execution of the bearing support assembly according to the invention with three bearing supports each designed as one piece;

FIG. 12 is a perspective view of another example of execution of the bearing support assembly according to the invention with three bearing supports each provided with cardan joints; and FIG. 13 is a perspective view of the support of FIG. 3 sectioned along the upper tilt axis.

DETAILED DESCRIPTION OF THE ILLUSTRATED EMBODIMENTS

The bearing support assembly 1 shown in FIG. 1 for a square-folded laser resonator comprises three one piece bearing supports 10, 20, 30 attached to a base plate 3 and on which the resonator frame 2 sits. The bearing support 10 corresponds in function to a fixed bearing with two rotational degrees of freedom, the bearing support 20 to a one-dimensional movable bearing with two rotational degrees and one translational degree of freedom, and the bearing support 30 to a two-dimensional movable bearing with two rotational and two translational degrees of freedom.

Figure 2:
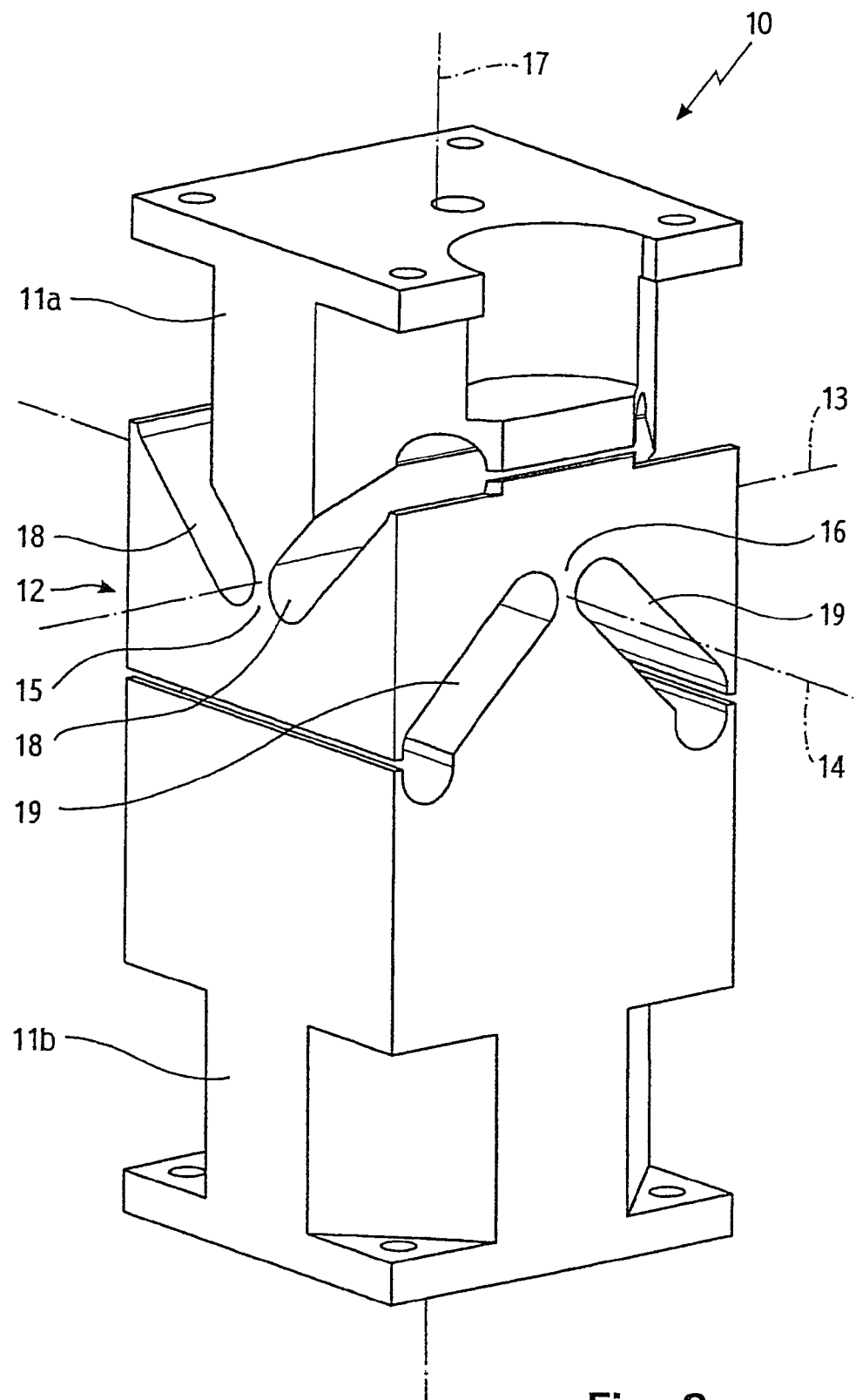
FIG. 2 is a perspective view of a bearing support designed as a fixed bearing of the bearing support assembly shown in FIG. 1.

The bearing support 10 shown in FIG. 2 comprises an upper support section 11a, having a support platform with a horizontal surface to which the laser resonator 2 is attached, and a lower support section 11b attached on the bottom to the base plate 3. The two support sections 11*a*, 11*b* are connected together as one piece by a defiectable joint 12 able to tilt all around. The deflection joint 12 has two horizontal tilt axes 13, 14 that are arranged rotated 90° from each other and intersect in the illustrated example of execution. The tilt axes 13, 14 are each defined by discontinuous deflection elements 15, 16 that are formed by two laterally open slits 18, 19 located opposite each other and running crosswise to the longitudinal axis 17 of the bearing support 10. In this connection, the slit 18 extends from the deflection element 15 diagonally upwardly and the slit 19 extends from the deflection element 16 diagonally downwardly. The two elements 15, 16 form a cross-shaped deflection element in the plane deferred by the two tilt axes 13, 14. The all around tilting of the upper support section 11*a* relative to the lower support section 11*b* is possible by tilting around a deflection element or by superimposed tilting around both deflection elements 15, 16. The deflection joint 12 thus forms a fixed joint able to tilt all around and the bearing support 10 thus forms a fixed bearing because it has no translational degree of freedom in the horizontal plane.

The bearing support 20 shown in FIG. 3 comprises three support sections 21*a*, 21*b*, 21*c*, where the upper and middle support sections 21*a*, 21*b* are connected together as one piece by an upper deflection joint 22 able to tilt all around, and the middle and lower support sections 21*b*, 21*c* are connected together as one piece by a lower deflection joint 23 able to tilt on two sides. The lower support section 21*c* is connected to the base plate 3 and there is no motion allowable between the lower support section 21*c* and the base plate 3. The upper support section 21*a* is connected to the resonator frame 2 and there is no motion allowable between the upper support section 21*a* and the resonator frame 2. To allow a translational motion of the resonator frame 2 relative to the base plate 3 in the horizontal plane (one translational degree of freedom) it is therefore necessary that the upper support section 21*a* can provide a translational motion in the horizontal plane relative to the lower support section 21*c*. The deflection joint 22 is designed identically to the deflection joint 12 of the bearing support 10. The upper deflection joint 22 has two horizontal tilt axes 24, 25 that are arranged rotated 90° from each other. The tilt axes 24, 25 are defined by discontinuous deflection elements that are formed by two laterally open slits located opposite each other. The two discontinuous elements form a cross-shaped deflection element in the plane deferred by the two tilt axes 24,25. The lower deflection joint 23 is defined by a continuous deflection element 27 that is formed by two horizontal, laterally open slits 28 situated opposite each other. The lower deflection joint is able to tilt on two sides of the tilt axis 26, which runs parallel to the tilt axis 25 of the upper deflection joint 22. Due to these two parallel tilt axes 25, 26 of the upper and lower deflection joints 22, 23, a parallel shifting of the upper support section 21*a* relative to the lower support section 21*c* in a horizontal direction (i.e., at right angles to the tilt axes 25, 26 along the tilt axis 24, as shown by rectilinear double arrow 29) is possible, namely if the upper support section 21*a* tilts around the tilt axis 25 of the upper deflection joint 22 (arcuate double arrow above tilt axis 25) in the opposite direction from the middle support section 21*b* tilts around the tilt axis 26 of the lower deflection joint 23 (arcuate double arrow above tilt axis 26). The bearing support 20 thus forms a one-dimensional movable bearing because it has two rotational degrees of freedom and a translational degree of freedom in the horizontal plane. The degrees of freedom of the bearing support 20 are: Rotation of the upper support section 21*a* around the first tilt axis 24 (arcuate double arrow above tilt axis 24), rotation of the upper support section 21*a* around the second tilt axis 25 (arcuate double arrow above tilt axis 25) and translation of the upper support section 21*a* along the first tilt axis 24 (rectilinear double arrow 29).

The bearing support 30 shown in FIG. 4 comprises three support sections 31*a*, 31*b*, 31*c*, where the upper and middle support sections 31*a*, 31*b* and the middle and lower support sections 31*b*, 31*c* are each connected together as one piece by an upper and a lower deflection joint 32, 33 able to tilt all around. The lower support section 31*c* is connected to the base plate 3 and the upper support section 31*a* to the resonator frame 2. There is no motion allowable between the lower support section 31*c* and the base plate 3 and between the upper support section 31*a* and the resonator frame 2. To allow a translational motion of the resonator frame 2 relative to the base plate 3 in all horizontal directions (two translational degrees of freedom) it is therefore necessary that the upper support section 31*a* can provide translational motions in two non-parallel directions in the horizontal plane relative to the lower support section 31*c*. The upper and lower deflection joints 32, 33 with their respective tilt axes 34, 35 and, respectively, 36, 37 are designed identically to the deflection joint 12 of the bearing support 10 and are arranged mirror-inverted relative to a horizontal center plane of the bearing support 30. Due to the respectively parallel tilt axes 34, 36 and 35, 37 of the upper and lower deflection joints 32, 33, a parallel shifting of the upper support section 31*a* relative to the lower support section 31*c* is possible in each horizontal direction (i.e. superposition of a translation along the tilt axis 34, as shown by rectilinear double arrow 39, and a translation along the tilt axis 35, as shown by rectilinear double arrow 40), namely because the upper support section 31*a* tilts around the tilt axes 34, 35 of the upper deflection joint 32 in the respective opposite direction from that of the middle support section 31*b* around the tilt axes 36, 37 of the lower deflection joint 33. The bearing support 30 thus forms a two-dimensional movable bearing because it has two rotational degrees of freedom and two translational degrees of freedom in the horizontal plane. The degrees of freedom of the bearing support 30 are: Rotation of the upper support section 31*a* around the first tilt axis 34 (arcuate double arrow above tilt axis 34), rotation of the upper support section 31*a* around the second tilt axis 35 (arcuate double arrow above tilt axis 35), translation of the upper support section 31*a* along the first tilt axis 34 (rectilinear double arrow 39) and translation of the upper support section 31*a* along the second tilt axis 35 (rectilinear double arrow 40).

The bearing supports 10, 20, 30 have a substantially square outer contour and are produced from identical massive basic bodies. This basic body can be an aluminum cast part, for example, from which the different fixed body joints of the bearing supports are produced by reworking, e.g., by opening of connecting links by milling, or by closing of slits by welding.

The bearing assembly 101 shown in FIG. 5 differs from the bearing assembly 1 of FIG. 1 in that its three bearing supports 110, 120, 130 are not designed as square massive bodies but rather as round, tubular bodies. The one piece bearing support 110 corresponds in function to a fixed bearing, the one-piece bearing support 120 corresponds to a one-dimensional movable bearing and the one-piece bearing support 130 corresponds to a two-dimensional movable bearing. As an alternative, cylindrical or other hollow bodies can also be used.

Analogous to the bearing support 10, the bearing support 110 shown in FIG. 6 has a deflection joint 112 able to tilt all around with two tilt axes 113, 114 and through which the two support sections 111a, 111b are connected together as one piece. Each tilt axis 113, 114 is defined respectively by two deflection elements 115, 116 situated opposite each other in the tube wall; only the front ones are illustrated in FIG. 6. The two deflection elements 115, 116 situated opposite each other are formed respectively by two laterally open slits 118, 119 running diagonally relative to the longitudinal axis 117 of the bearing support 110, and, in this connection, the slit 118 extends from the deflection elements 115 diagonally upwardly and the slit 119 extends from the deflection elements 116 diagonally downwardly. The two tilt axes 113, 114 are rotated 90° from each other and intersect in the illustrated example of execution. Corresponding to the bearing support 10, the bearing support 110 forms the fixed bearing of the bearing assembly 101.

Analogous to the bearing support 20, the bearing support 120 shown in FIG. 7 comprises a deflection joint 122 able to tilt all around and a deflection joint 123 able to tilt on two sides. These connect the two support sections 121a, 121b and the two support sections 121b, 121c together as one piece in each case. The deflection joint 122 with the two tilt axes 124, 125 is designed identically to the deflection joint 112 of the bearing support 110. The tilt axis 126, running parallel to the tilt axis 125, of the deflection joint 123 able to tilt on two sides is defined by two deflection elements 127 situated opposite each other in the tube wall, of which only the front one is illustrated in FIG. 7. These two deflection elements 127 situated opposite each other are formed by two horizontal open slits 128.

Corresponding to the bearing support 20, the bearing support 120 forms the one-dimensional movable bearing of the bearing assembly 101.

Analogous to the bearing support 30, the bearing support 130 shown in FIG. 8 comprises upper and lower deflection joints 132, 133 able to tilt all around and which connect two adjacent support sections 131a, 131b and 131b, 131c, respectively together as one piece in each case. The two deflection joints 132, 133 with their respective tilt axes 134, 135 and 136, 137 are designed identically to the deflection joint 112 of the bearing support 110. Corresponding to the bearing support 30, the bearing support 130 forms the two-dimensional movable bearing of the bearing assembly 101.

The bearing support 230 shown in FIG. 9 is designed as an aluminum casting part and has upper and lower deflection joints 232, 233 able to tilt all around, through which the two support sections 231a, 231b and, respectively, the two support sections 231b, 231c of the bearing support 230 are each connected together as one piece. As is shown by the example of the upper articulated joint 232, the deflection joints 232, 233 with their respective tilt axes 234, 235 and 236, 237 have two discontinuous deflection elements 238, 239 rotated 90° from each other, each of which is formed by laterally open slits 240, 241. The slits 240 extend from the deflection element 238 diagonally upwardly and the slits 241 extend from the element 239 diagonally downwardly. The two deflection joints 232, 233 are designed identically and are arranged mirror-inverted relative to a horizontal center line of the bearing support 230. To take technical casting requirements into account, hollow spaces 242 of different configurations are provided in the bearing support 230. Corresponding to the bearing support 30, the bearing support 230 forms a two-dimensional movable bearing support.

The aluminum cast part is preferably designed with connecting elements 250 that bridge the slits 240, 241 at their ends situated opposite the deflection joints, and tilting is thus not possible. Depending on the desired type of bearing support, the bearing support can be equipped with different translational degrees of freedom by subsequent separation of connecting elements 250, as shown in FIG. 9. Alternatively, translational degrees of freedom of the bearing support can be restricted if already separated connecting elements are closed or connected again.

FIG. 10a shows a bearing support 310 composed of two identical bearing support halves 310a, 310b, mirror-inverted relative to a horizontal center line. These bearing support halves each form support sections 311a, 311b and complement each other to form a deflection joint 312 able to tilt all around with two tilt axes 313, 314. The two bearing support halves 310a, 310b can be produced particularly inexpensively as extrusion profiles. As is shown in FIG. 10b as an example for the upper bearing support half 310a, each bearing support half comprises on the connection side two projections 316 separated from each other by a continuous recess 315. In each of the projections 316, a deflection element 317 is formed by two slits 318 that each run diagonally upwardly from the deflection element 317. In the illustrated example of execution, the slits 318 are each closed by a connecting element 319 on their side facing away from the deflection element 317. The two bearing support halves 310a, 310b are rotated 90° toward each other and ate connected with each other, and the projections 316 of the one bearing support half mesh with the recesses 315 of the other bearing support half and complete the two bearing support halves 310a, 310b to form a cube. After the connecting elements 319 are separated, the bearing support 310 forms with its two tilt axes 313, 314 a fixed bearing support corresponding to the bearing support 10.

In FIG. 11, a further bearing assembly 401 for a square-folded laser resonator with three massive cylindrical bearing supports 410, 420, 430 is shown. The one-piece bearing support 410 corresponds in function to a fixed bearing support, the one-piece bearing support 420 corresponds to a one-dimensional movable bearing support, and the one-piece bearing support 430 to a two-dimensional movable bearing support.

The two support sections 411a, 411b of the bearing support 410 are connected together as one piece by a deflection joint 412 able to tilt all around, and it is formed by a round central deflection element 413 with an outer contour receding radially inwardly relative to the support sections 411a and 411b, respectively. The upper support section 411a is able to tilt relative to the lower support section 411b around each horizontal axis running through the deflection element 413 and thus all around. Since each desired tilting motion is always fragmented into tilting motions around two different tilt axes, two tilt axes 414, 415 intersecting at right angles are illustrated. Corresponding to the bearing support 10, the bearing support 410 forms with its two tilt axes 414, 415 the fixed bearing support of the bearing assembly 401.

The bearing support 420 comprises an upper deflection joint 422 able to tilt all around and a lower deflection joint 423 able to tilt on two sides and connects the two support sections 421a, 421b and the two support sections 421b, 421c together as one piece in each case. The deflection joint 422 with the two tilt axes 424, 425 is designed identically to the deflection joint 412 of the bearing support 410. The tilt axis 426, running parallel to the tilt axis 424, is defined by a continuous deflection element 427 formed by two horizontal, laterally open slits 428. Corresponding to the bearing support 20, the bearing support 420 forms the one-dimensional movable bearing support of the bearing assembly 401.

The bearing support 430 comprises upper and lower deflection joints 432, 433 able to tilt all around, that connect two adjacent support sections 431a, 431b and 431b, 431c, together as one piece in each case. The two deflection joints 432, 433 are designed identically to the deflection joints 412 and 422. Corresponding to the bearing support 30, the bearing support 430 forms the two-dimensional movable bearing of the bearing assembly 401.

The bearing assembly 501 shown in FIG. 12 comprises three bearing supports 510, 520, 530 designed in multiple sections, and the bearing support 510 forms a fixed bearing support, the bearing support 520 a one-dimensional movable bearing support, and the bearing support 530 a two-dimensional movable bearing support.

The bearing support 510 comprises upper and lower support section 511a, 511b that are both connected together by a cardan joint 512. The two joint axes of the cardan joint 512 are marked 513 and 514. Corresponding to the bearing support 10, the bearing support 510 forms the fixed bearing support of the bearing assembly 501.

The bearing support 520 comprises upper and middle support sections 521a, 521b that are connected together by a cardan joint 522 designed identically to the cardan joint 512, as well as a lower support section 521c that is connected with the middle support section 521b by a joint 523. The joint axis 524 of this joint 523 runs parallel to one of the joint axes of the cardan joint 522. Corresponding to the bearing support 20, the bearing support 520 forms the one-dimensional movable bearing support of the bearing assembly 501.

The bearing support 530 comprises three support sections 531a, 531b, 531c, that are each connected together by an upper cardan joint 532, 533. The cardan joints 532, 533 are designed identically to the cardan joints 512 and 522. Corresponding to the bearing support 30, the bearing support 530 forms the two-dimensional movable bearing support of the bearing assembly 501.

In each of the bearing support 10 for a laser resonator, adjacent support sections 11a, 11b are each directly connected together undetachably by an articulated joint 12 provided between them. An additional vertical safety on the bearing support is no longer required since the two support sections 11a, 11b are already vertically secured by the articulated joint 12.

As will be readily appreciated, the metal section between the ends of the slits providing the deflectable joints must enable resilient deflection under the load of the laser resonator supported thereby. Accordingly, the metal sections between the ends of the slits along any tilt axis must have a sufficient area so that the deflective force acting thereon is within the elastic limits of the metal employed in its fabrication;

$G = m \cdot g$ wherein G is the deflective force,
m is the mass of the resonator,
g is the gravitational acceleration,
$\Sigma = G \cdot A_t$ $A_t$ is the combined cross sectional area of the sections of the joint where the deflection will occur (the joint axis)
$A_t = A_1 + A_2 + A_3$ and
$\Sigma = G \cdot A_t$ $\Sigma_d$ = elastic limit of the metal
$\Sigma \leq \Sigma_d$ As a specific example, a bearing support having the configuration shown in FIG. 13 and fabricated of aluminum has a generally square cross section, 80 mm×80 mm. The slits 18 have a width of 12 mm and have their inner ends spaced apart 4.2 mm. As seen in FIG. 13, this produces three sections between the ends of slits on the tilt axis 14 with the areas $A_1$, $A_2$ and $A_3$.

Having thus described the invention, what is claimed is:

1. An integrally formed, one-piece bearing support (10, 20, 30; 110, 120, 130; 230; 310; 410, 420, 430; 510, 520, 530), for supporting a laser resonator, having a support platform with a horizontal surface, said bearing support having multiple pairs of adjacent bearing support sections (11a, 11b; 21a, 21b, 21c; 31a, 31b, 31c; 111a, 111b; 121a, 121b, 121c; 131a, 131b, 131c; 231a, 231b, 231c; 311a, 311b; 411a, 411b; 421a, 421b, 421c; 431a, 431b, 431c; 511a, 511b, 521a, 521b, 521c; 531a, 531b, 531c) with an articulated deflectable joint provided between the adjacent support sections permitting tilting of one section relative to the other section of the pair (12; 22, 23; 32, 33; 112; 122, 123; 132, 133; 232, 233; 312; 412; 422, 423; 432, 433; 512; 522, 523; 532, 533), characterized in that the adjacent bearing support sections (11a, 11b; 21a, 21b, 21c; 31a, 31b, 31c; 111a, 111b; 121a, 121b, 121c; 131a, 131b, 131c; 231a, 231b, 231c; 311a, 311b; 411a, 411b; 421a, 421b, 421c; 431a, 431b, 431c; 511a, 511b; 521a, 521b, 521c; 531a, 531b, 531c) are each directly connected together undetachably by said articulated deflectable joints (12; 22, 23; 32, 33; 112; 122, 123; 132, 133; 232, 233; 312; 412; 422, 423; 432, 433; 512; 522, 523; 532, 533), at least one pair of support sections having an articulated deflectable joint with at least two non-parallel tilt axes displaced from and extending angularly to each other to provide a universally resiliently deflectable joint between the pair of sections (13, 14; 24, 25; 34, 35; 36, 37; 113, 114; 124, 125; 134, 135; 136, 137; 234, 235; 236, 237, 313, 314; 414, 415, 425, said bearing support (20; 120; 420) having an additional articulated deflectable joint (23; 123; 423;) able to tilt on two sides and providing a deflectable joint with at least one deflectable element (27, 127, 427;) defining the joint axis (26; 126, 426), said joint axis (26, 126, 426) of said additional articulated deflectable joint being parallel to a joint axis of said first mentioned articulated deflectable joint, said bearing support thus providing two rotational degrees of freedom and allowing the support platform to be displaced in a horizontal direction.

2. A bearing support according to claim 1, wherein said support includes multiple pairs of articulated sections providing multiple pairs of spaced non-parallel perpendicular tilt axes between adjacent sections extending angularly to each other.

3. The bearing support according to claim 2, wherein said bearing support (310) is comprised of two identical halves (310a, 310b).

4. The bearing support according to claim 1 wherein two tilt axes (13, 14; 24, 25; 34, 35; 36, 37; 113, 114; 124, 125; 134, 135; 136, 137; 234, 235; 236, 237; 313, 314; 414, 415; 424, 425; 334) of the articulated deflectable joint (12; 22; 32, 33; 112; 122; 132, 133; 232, 233; 312; 412; 422; 432, 433) are disposed in the same plane.

5. The bearing support according to claim 1 wherein the articulated deflectable joint (412; 422; 432, 433) has a central deflection joint (413) that recedes relative to its adjacent support sections in each case (411a, 411b; 421a, 421b; 431a, 431b, 431c).

6. The bearing support according claims 1 wherein said deflectable element (15, 16; 27; 115, 116; 127; 238, 239; 317) is formed by two slits situated opposite each other and open on the side (18, 19; 28; 118, 119; 128; 240, 241; 318).

7. The bearing support according to claim 1, wherein said articulated joint (12; 22, 23; 32, 33; 112; 122, 123; 132, 133;

232, 233; 412; 422, 423; 432, 433) is produced by subsequent opening of connecting links (250; 319).

8. The bearing support according to claim 1 wherein said articulated joint is produced by subsequent closing of laterally open slits (18, 19; 28; 118, 119; 128; 240, 241; 318).

9. The bearing support according to claim 1 wherein said bearing support (10, 20, 30; 110, 120, 130; 410, 420, 430) is a hollow body.

10. The bearing support according to claim 1 wherein said bearing support (230) is a casting.

11. The bearing support according to claim 1 wherein said articulated joint (512; 522; 532, 533) is a cardan joint.

12. The bearing support according to claim 11 wherein a deflectable joint (523) able to tilt on two sides is provided at a distance spaced from said cardan joint (522) in the longitudinal direction of the bearing support (520).

13. The bearing support according to claim 11 wherein said bearing section (511a, 511b; 521a, 521b, 521c ; 531a, 531b, 531c) and the cardan body of the cardan joint (512; 522; 532, 533) is able to shift in the direction of said at least one of said two tilt axes (513, 514).

14. The bearing support according the claim 12, wherein said bearing support (530) has two cardan joints (532, 533) arranged one above the other.

15. The bearing support according to claim 12 wherein said cardan body of the cardan joint is mounted able to shift in the direction of the two joint axes (513, 514).

16. A bearing support assembly (1; 101; 401; 501) for a laser resonator, said support assembly comprising three bearing supports each being an integrally formed one-piece bearing support (10, 20, 30; 110, 120, 130; 230; 310; 410, 420, 430; 510, 520, 530) for supporting a laser resonator, having a support platform with a horizontal surface, each support having multiple pairs of bearing support sections (11a, 11b; 21a, 21b, 21c; 31a, 31b, 31c; 111a, 111b; 121a, 121b, 121c; 131a, 131b, 131c; 231a, 231b, 231c; 311a, 311b; 411a, 411b; 421a, 421b, 421c; 431a, 431b, 431c; 511a, 511b; 521a, 521b, 521c; 531a, 531b, 531c) with an articulated deflectable joint between the pairs of adjacent support sections permitting tilting of one section relative to the other section of the pair (12; 22, 23; 32, 33; 112; 122, 123; 132, 133; 232, 233; 312; 412; 422, 423; 432, 433; 512; 522, 523; 532, 533), characterized in that the adjacent bearing support sections (11a, 11b; 21a, 21b, 21c; 31a, 31b, 31c; 111a, 111b; 121a, 121b, 121c; 131a, 131b, 131c; 231a, 231b, 231c; 311a, 311b; 411a, 411b; 421a, 421b, 421c; 431a, 431b, 431c; 511a, 511b; 521a, 521b, 521c; 531a, 531b, 531c) are directly connected together undetachably by said articulated deflectable joint (12; 22, 23; 32, 33; 112; 122, 123; 132, 133; 232, 233; 312; 412; 422, 423; 432, 433; 512; 522, 523; 532, 533), at least one articulated deflectable joint having at least two tilt axes displaced from and perpendicular to each other to provide a universally resiliently deflectable joint between the pair of sections (13, 14; 24, 25; 34, 35; 36, 37; 113, 114; 124, 125; 134, 135; 136, 137; 234, 235; 236, 237; 313, 314; 414, 415, 425) and allowing the support platform to be displaced in a horizontal direction.

17. The bearing support assembly according to claim 16 wherein said three bearing supports (10, 20, 30; 110, 120, 130; 230; 310; 410, 420, 430; 510, 520, 530) have at the same vertical level an articulated deflectable joint able to tilt all around (12; 22; 32; 112; 122; 132; 232; 312; 412; 422; 432; 512; 522; 532), and wherein one of said bearing supports (20; 120; 420; 520) additionally has an articulated deflectable joint (23; 123; 423; 523) able to tilt on two sides and another one of said bearing supports (30; 130; 230; 430; 530) additionally has a further articulated joint (33; 133; 233; 433; 533) able to tilt all around.

18. A bearing support according to claim 1 wherein said two tilt axes extend perpendicularly to each other.

19. An integrally formed, one-piece bearing support (10, 20, 30; 110, 120, 130; 230; 310; 410, 420, 430; 510, 520, 530), for supporting a laser resonator, having a support platform with a horizontal surface, with at least two bearing support sections (11a, 11b; 21a, 21b, 21c; 31a, 31b, 31c; 111a, 111b; 121a, 121b, 121c; 131a, 131b, 131c; 231a, 231b, 231c; 311a, 311b; 411a, 411b; 421a, 421b, 421c; 431a, 431b, 431c; 511a, 511b; 521a, 521b, 521c; 531a, 531b, 531c) and an articulated deflectable joint provided between at least one pair of adjacent support sections permitting tilting of one section relative to the other section of the pair (12; 22, 23; 32, 33; 112; 122, 123; 132, 133; 232, 233; 312; 412; 422, 423; 432, 433; 512; 522, 523; 532, 533), characterized in that the adjacent bearing support sections (11a, 11b; 21a, 21b, 21c; 31a, 31b, 31c; 111a, 111b; 121a, 121b, 121c; 131a, 131b, 131c; 231a, 231b, 231c; 311a, 311b; 411a, 411b; 421a, 421b, 421c; 431a, 431b, 431c; 511a, 511b; 521a, 521b, 521c; 531a, 531b, 531c) are each directly connected together undetachably by said articulated deflectable joint (12; 22, 23; 32, 33; 112; 122, 123; 132, 133; 232, 233; 312; 412; 422, 423; 432, 433; 512; 522, 523; 532, 533), at least one articulated deflectable joint having at least two non-parallel tilt axes displaced from and extending angularly to each other to provide a universally resiliently deflectable joint between the pair of sections (13, 14; 24, 25; 34, 35; 36, 37; 113, 114; 124, 125; 134, 135; 136, 137; 234, 235; 236, 237; 313, 314; 414, 415, 425, said at least one bearing support (30, 130;, 230; 430) having two deflectable joints (32, 33; 132, 133; 232, 233; 432, 433) with parallel tilt axes arranged one above the other and able to tilt all around, said bearing support thus providing two rotational degrees of freedom and allowing the support platform to be displaced in a horizontal direction.

20. A bearing support according to claim 19 wherein said support includes multiple pairs of articulated sections providing multiple pairs of spaced non-parallel perpendicular tilt axes between adjacent sections extending angularly to each other.

21. The bearing support according to claim 19 wherein two tilt axes (13, 14; 24, 25; 34, 35; 36, 37; 113, 114; 124, 125; 134, 135; 136, 137; 234, 235; 236, 237; 313, 314; 414, 415; 424, 425; 334) of the articulated deflectable joint (12; 22; 32, 33; 112; 122; 132, 133; 232, 233; 312; 412; 422; 432, 433) are disposed in the same plane.

22. The bearing support according claims 19 wherein said deflectable element (15, 16; 27; 115, 116; 127; 238, 239; 317) is formed by two slits situated opposite each other and open on the side (18, 19; 28; 118, 119; 128; 240, 241; 318).

23. The bearing support according to claim 19, wherein said articulated joint (12; 22, 23; 32, 33; 112; 122, 123; 132, 133; 232, 233; 412; 422, 423; 432, 433) is produced by subsequent opening of connecting links (250; 319).

24. The bearing support according to claim 19 wherein said articulated joint (512; 522; 532, 533) is a cardan joint.

* * * * *